United States Patent [19]

Molitor

[11] Patent Number: 4,540,045

[45] Date of Patent: Sep. 10, 1985

[54] HEAT EXCHANGER

[76] Inventor: Victor D. Molitor, 90 Corona St., Denver, Colo. 80218

[21] Appl. No.: 11,402

[22] Filed: Feb. 12, 1979

Related U.S. Application Data

[60] Continuation-in-part of Ser. No. 836,085, Sep. 23, 1977, abandoned, which is a division of Ser. No. 621,284, Oct. 10, 1975, Pat. No. 4,071,935, which is a continuation-in-part of Ser. No. 602,685, Aug. 7, 1975, abandoned.

[51] Int. Cl.³ .............................................. F28D 7/02
[52] U.S. Cl. .................................... 165/164; 165/156; 165/163; 165/DIG. 10
[58] Field of Search .................. 165/153, 163, 164, 10, 165/156, 172, 180, 181, DIG. 10, 179; 29/153–153 R; 113/118; 62/515

[56] References Cited

U.S. PATENT DOCUMENTS

| | | | |
|---|---|---|---|
| 2,061,742 | 11/1936 | Swart | 165/163 |
| 2,083,732 | 6/1937 | Moore et al. | 165/10 |
| 2,112,793 | 3/1938 | Poule | 165/164 |
| 2,586,250 | 2/1952 | Parker | 165/10 |
| 3,262,190 | 7/1966 | Rostoker et al. | 165/DIG. 10 |
| 3,335,790 | 8/1967 | Aranyi et al. | 165/156 |
| 3,364,990 | 1/1968 | Rubin | 165/134 |
| 3,395,754 | 8/1968 | French | 165/185 |

FOREIGN PATENT DOCUMENTS

1129975  5/1962  Fed. Rep. of Germany ...... 165/153

Primary Examiner—Douglas Hart
Attorney, Agent, or Firm—H. B. Van Valkenburgh

[57] ABSTRACT

The heat exchanger has a hollow coil through which a liquid is to flow, having a series of adjacent, essentially parallel turns, between which turns members having apertures for the flow of a fluid therethrough, elongated heat conducting paths and in compressed and deformed condition are disposed, for clamping contact with the turns and pressure contact with each other. Examples of such members are woven mesh having strands and expanded metal foil. The members extend across the space encompassed by the turns and thus conduct heat between the turns and a fluid passed through the mesh members in the direction of the axis of the coil, i.e. perpendicular to the planes of the coil turns. The members and coil turns are maintained in compressing contact by a perforated plate at each end of the coil, which plates engage the adjacent members. These plates are held in position by a housing which extends laterally around the members and coil, the housing conveniently being formed of a pair of angular member which may be moved toward each other, to compress the members laterally and the abutting edges then welded, after which the perforated plates may be welded to the angular members.

15 Claims, 14 Drawing Figures

Fig_1

Fig_4

Fig_2

Fig_3

Fig_5

Fig_6

Fig_7

Fig_8

Fig_9

Fig_10

Fig_11

Fig_12

Fig_13

HEAT EXCHANGER

This application is a continuation-in-part of my copending application Ser. No. 836,085 filed Sept. 23, 1977, now abandoned, in turn a division of my application Ser. No. 621,284 filed Oct. 10, 1975, now U.S. Pat. No. 4,071,935 for "Method of Making Heat Exchanger", in turn a continuation-in-part of my application Ser. No. 602,685 filed Aug. 7, 1975 for "Makeup Air Tempering for Grease Extraction Ventilator and Heat Exchanger", now abandoned, but a continuation-in-part of which is my application Ser. No. 768,152 filed Feb. 14, 1977 for "Makeup Air Tempering for Grease Extraction Ventilator", now U.S. Pat. No. 4,124,021.

This invention relates to heat exchangers and more particularly to heat exchangers in which transfer of heat between a liquid and a fluid, such as a gas or vapor, is desired.

BACKGROUND OF THE INVENTION

In prior heat exchangers of the countercurrent type, the differential between the temperature of the liquid heating medium or coolant, as the case may be, and the gas or vapor discharged has been several degrees. Even in heat exchangers in which tubing in the form of several parallel pipes is provided with fins, or a pipe coil, again provided with fins, or a tube forming a series of turns in essentially the same plane and again provided with fins, the temperature differential has been unduly great. An increase in pressure, to provide a greater flow of liquid through the tube or pipe or of gas or vapor through the area around the pipe, has not sufficiently increased the heat transfer to warrant the additional pumping or blower expense. In addition, unless the unit is very large and costly, heat exchangers have not transferred heat between a liquid and a fluid, such as a gas or vapor, efficiently enough to utilize low energy differences.

Among the objects of this invention are to provide a novel heat exchanger; to provide such a heat exchanger which provides a greater efficiency, as indicated by the temperature differential between the liquid in and of the fluid out; to provide such a heat exchanger which includes a series of members through which a fluid passes; to provide such a heat exchanger in which the members are in an improved heat conducting relationship with tubing or coils through which a liquid flows; to provide such a heat exchanger which is applicable to a wide variety of uses; and to provide such a heat exchanger which is economical to construct and is effective and efficient in use.

SUMMARY OF THE INVENTION

The essence of the present invention lies in the use of a series of heat conductive, deformable members having apertures for the flow of fluid transversely therethrough, elongated heat conductive paths across the members, with the members compressed against each other and between successive adjacent and preferably parallel turns of a tubular coil through which a liquid is to flow, the members also being deformed against the coil turns and maintained in compressed and deformed condition. The members extend across the coil and across the area, both within the coil turns and a desirable distance outside the coil turns, while maintained in the compressed and deformed condition. Such members are conveniently exemplified by a woven wire mesh or an expanded metal foil. Not only is an effective heat conducting contact between the members and the coil turns produced and the surface area of such contact increased, but also increased is the number of paths of the members through which heat is conducted to or from the area of passage of the fluid in a direction transverse to the planes of the respective coil turns.

THE DRAWINGS

The foregoing objects and the novel features of this invention will become apparent from the description which follows, taken in conjunction with the accompanying drawings, in which.

DESCRIPTION OF THE PREFERRED EMBODIMENTS

Figure 1:
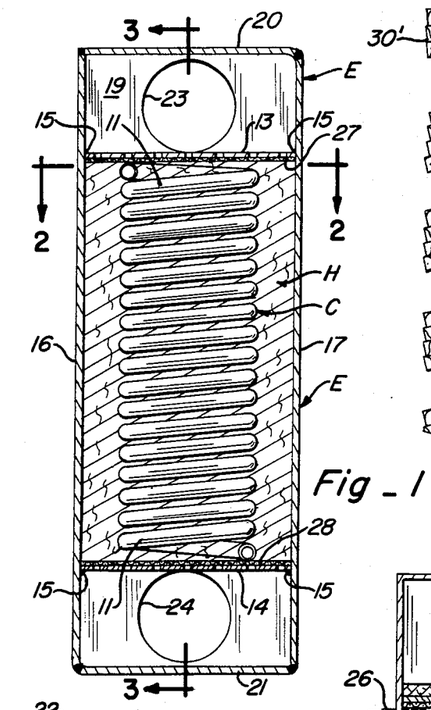
FIG. 1 is a transverse vertical section, taken along line 1—1 of FIG. 2, of a heat exchanger constructed in accordance with this invention.
Figure 2:
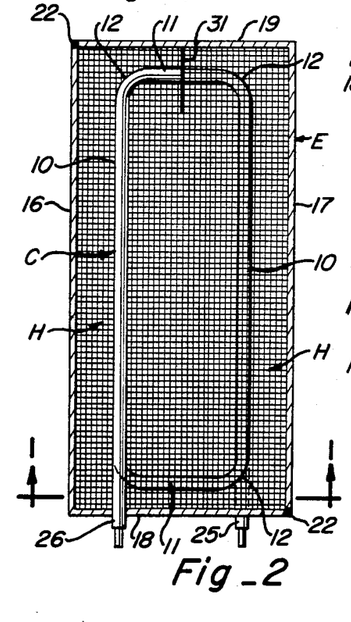
FIG. 2 is a horizontal section taken along line 2—2 of FIG. 1.
Figure 3:
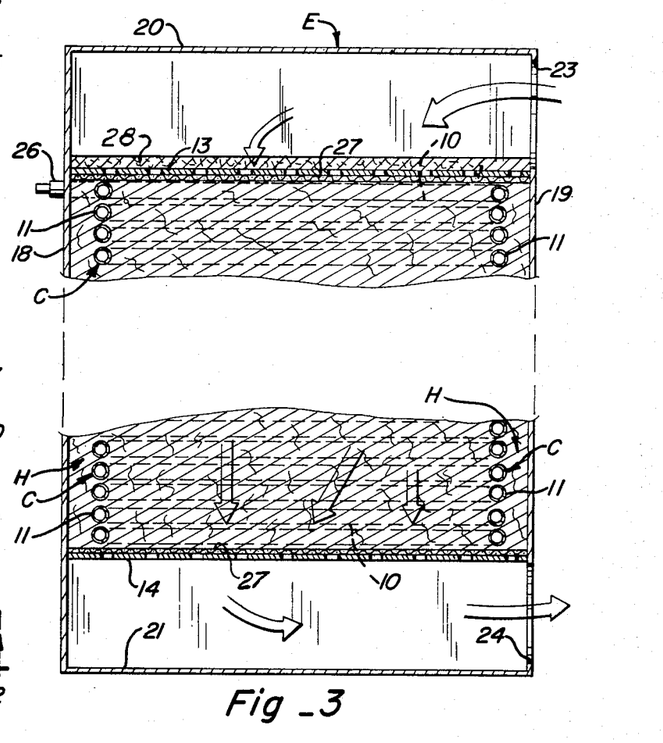
FIG. 3 is a longitudinal vertical section, taken along line 3—3 of FIG. 1.

A heat exchanger E constructed in accordance with this invention, as illustrated in FIGS. 1-3, includes a coil C embedded in and contacting a heat transfer material H through which passes the fluid, to or from which heat is to be transferred, in a direction generally perpendicular to the approximate planes of the coil turns. As in FIG. 2, the coil C has turns including sides 10 and ends 11 joined by curved, 90° corners 12 providing a generally rectangular configuration, although it will be understood that many other configurations may be found to be desirable and that more than one coil may be utilized.

In accordance with this invention, the heat transfer material H comprises a series of heat conductive, deformable members having apertures for flow of fluid and elongated heat conducting paths, compressed against each other and compressed between and deformed against the coil turns, with the members maintained in compressed and deformed condition between a top perforated plate 13 and a bottom perforated plate 14, each attached in a suitable manner, as by spot welds 15, to side walls 16 and 17 of a housing. The housing also includes a front wall 18 and a rear wall 19, as well as a top wall 20 and a bottom wall 21. For a purpose hereinafter described, side wall 16 may be integral with front wall 18 and side wall 17 may be integral with rear wall 19, with the two angular wall portions being connected at opposite abutting corners by welds 22, as in FIG. 2.

The space between top perforated plate 13 and top wall 20 comprises an inlet chamber or manifold, with an inlet opening 23 in rear wall 19 being connected to an inlet pipe or the like for the fluid which passes into the upper manifold and then through the heat transfer material H, conveniently both within the area of the turns of the coil C and also outside the turns of the coil and the respective walls, as indicated by the arrows of FIG. 3, in a direction generally transverse to the planes of the respective coil turns. Similarly, adjacent the bottom an outlet manifold is formed between bottom perforated plate 14 and the bottom wall 21. The fluid flows from the heat transfer material H into this outlet manifold for discharge through an outlet opening 24 in rear wall 19 to which a suitable pipe or tube may be attached, if necessary, for leading the fluid, such as a gas or vapor, to a point of use. An inlet 25 and an outlet 26 for coil C, as in FIGS. 2 and 3, extend through front wall 18 at lower and upper positions, so that countercurrent flow of the liquid and fluid will be provided. In the event the fluid inlet is at the bottom and the outlet is at the top, the coil liquid may then be delivered to pipe 26 and pass out through pipe 25. As will be evident, the heat exchanger need not be placed with the longitudinal axis of the coil in a vertical position, as shown, but may be placed with such axis in a horizontal position or at any angle between horizontal and vertical.

A screen 27 may be interposed between the top perforated plate 13 and the heat transfer material H, as well as between the bottom perforated plate 14 and the heat transfer material H, to hold the material securely between the plates. The plates 13 and 14 may be perforated plates of any type, although an expanded metal plate having solid edges, for welding to the inside of the housing, has been found to be particularly effective in its minimum resistance to fluid flow and its effectiveness in holding and maintaining the heat transfer material clamped within the unit. Above the top perforated plate 13, a filter 28 of FIG. 3, as of fiberglass, may be interposed to catch any lint or other particles which might tend to enter and clog the material H. The inlet opening 23 may be made slightly larger than necessary for vapor or gas flow, so that an easily opened access connection may be installed at the hole for the purpose of inspecting and cleaning the filter 28. If desired, for the same purpose, a removable access plate may be incorporated in the top wall 20.

Figure 4:
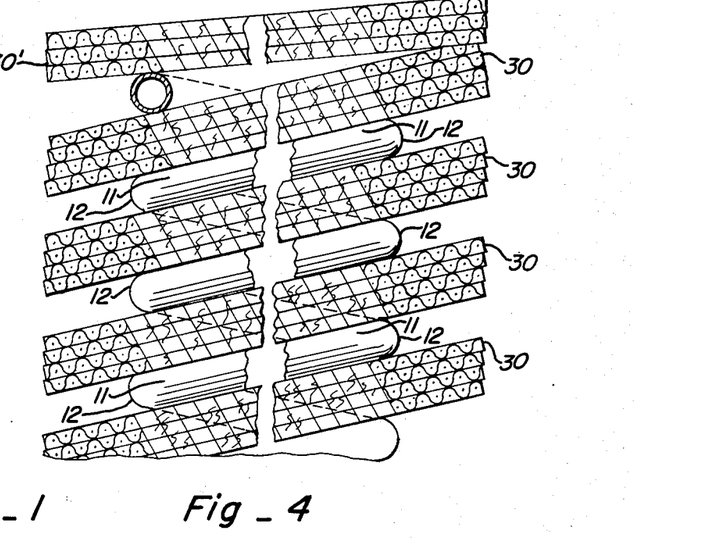
FIG. 4 is a fragmentary, condensed vertical section, on an enlarged scale, showing a series of spaced coils and layers of uncompressed heat transfer mesh prior to compression of both.

The turns of coil C may be initially formed or pulled apart to provide a gap between corresponding portions of adjacent turns a reasonable distance, such as in excess of the tube diameter, as in FIG. 4. Then, several members 30, of the type previously described, are inserted between adjacent turns, with the intersection of the members with the opposite end 11 of the coil being accommodated by a slit 31, as in FIG. 2. As will be evident from FIG. 4, the slit permits a series of uncompressed members 30 which, in uncompressed condition, desirably are somewhat thicker than the individual coil turn to be placed between adjacent coils. Additional uncompressed members 30' are placed on top of the uppermost coil, with a similar set of members beneath the lowermost coil, so that the coils throughout the entire length thereof will be in engagement, both at the top and at the bottom, with the members.

Figure 5:
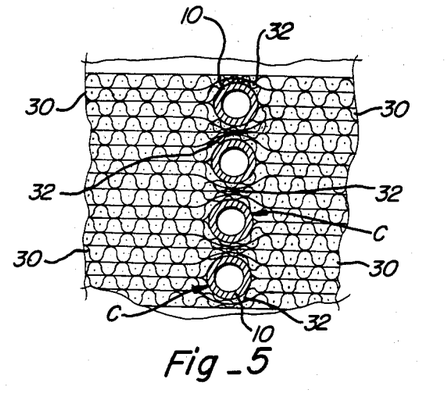
FIG. 5 is a fragmentary vertical section, also on an enlarged scale, showing several coils and heat transfer mesh after compression of both.

In accordance with this invention, the turns of coil C are compressed together against the previously uncompressed members 30, either as a unit, in successive pairs or any other suitable order, to provide, as in FIG. 5, compressed and deformed members 32 between the coil turns and for a reasonable distance around the turns. This results not only in a contact of the threads, strands, filaments, wires, strips or the like, as the case may be, of the members with the coil turns, but also a nearly solid contact with the coil turns in the compressed area through deformation of the members. As will be evident, when a liquid is passed through the coil C while a fluid, such as a gas or vapor, is passed through the members, conduction of heat along the heat conductive paths of the members will include the central area within the coil and also the area outside the perimeter of the coil. The coil C and members 30 may be formed of any suitable material. For cooling of air by water, a suitable material for the coil C is copper, because of its high rate of heat conductivity and its ductility, while one suitable material for the members 30, when a woven wire mesh, is also copper, not only because of its high rate of heat conduction and ductility, enabling it to be readily woven or otherwise formed into a cloth-like arrangement, but also its property of tending to stay in any position in which it is crushed or bent. These properties of copper enable a relatively large amount of heat to flow between the coil C and the heat transfer material H in either direction. However, mesh formed of aluminum strands has been used when the lesser cost of the aluminum produces sufficient economy of initial cost to offset the higher heat conductivity rate and resultant higher heat transfer efficiency of copper.

Another suitable material for the members 30 is aluminum, which also has a high rate of heat conductivity, though not as high as that of copper, but somewhat less ductility and therefore is more conveniently utilized in the form of an expanded foil, produced from foil on the order of 0.002 to 0.004 inches in thickness. The aluminum foil is expanded to an area greater than that of the original sheet, producing spaces between ribs or ribbons connecting small panels or junctions and thereby numerous elongated heat conducting paths. The expansion operation also tends to twist the ribbons and small panels from the original plane of the sheet, thereby presenting edges which may be deformed by compression against other foil members or between coil turns. Copper or other material can, of course, be utilized for expanded foil.

It will be noted that, with low outside temperatures, it is necessary for the ambient water of the grease extraction ventilator of my aforesaid U.S. Pat. No. 4,124,021 to heat makeup air coming into the room. In this instance, heat flows from the coil C to the members 30, thereby heating the cold incoming air. However, when the outside temperature is higher than the room temperature, the ambient temperature of the water circulated through the coil C will be less than the temperature of the outside air, with the result that the liquid flow through the coil C will be cooling the incoming air, with heat flowing to the coil C.

In addition to the compressed strands, wire, ribbons and the like of the members 30 between the turns of coil C, there will also be compression of the remainder of each member 30, both within the perimeter of the coil and outside the perimeter of the coil, since the initial thickness of the members between coil turns, as in FIG. 4, may be greater than the diameter of the tube. This compression of the members against each other, at points spaced from the coil, apparently further advances the heat exchange, since heat can be transferred by conduction between the strands, wires, ribbons and the like of one member 30 and adjacent members 30.

Figure 6:
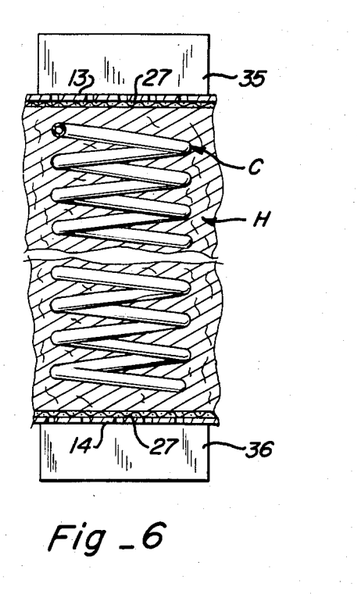
FIG. 6 is a condensed vertical section, corresponding to FIG. 4, but on a reduced scale, showing a pair of clamping jaws in position for a compression operation.
Figure 7:
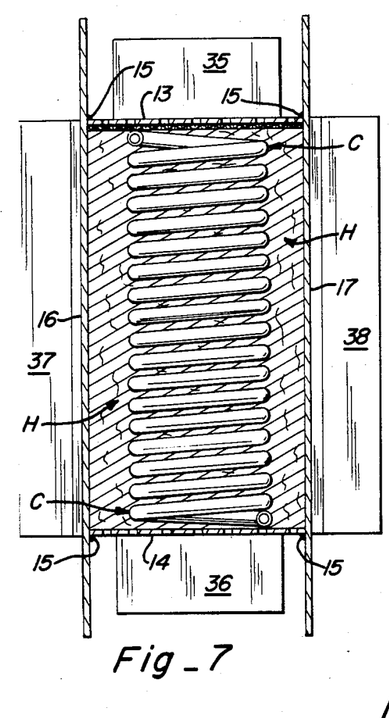
FIG. 7 is a vertical section similar to FIG. 1 but showing the clamping jaws of FIG. 6 with an additional set of clamps and at the completion of the clamping operation.
Figure 8:
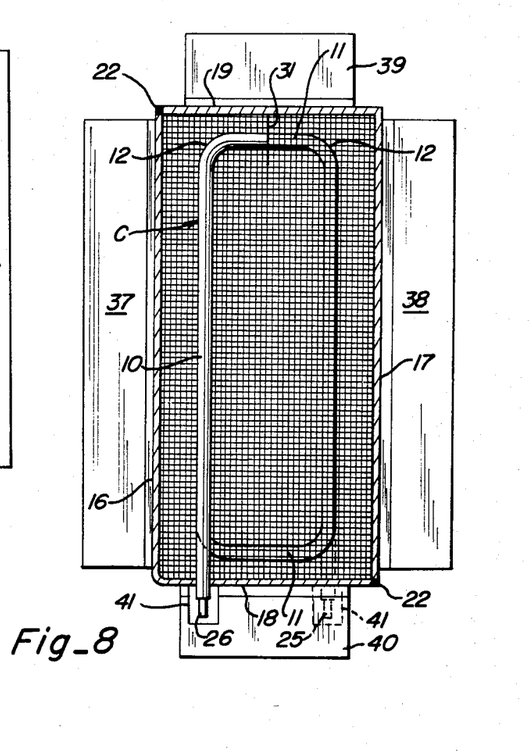
FIG. 8 is a horizontal section corresponding to FIG. 2, showing a further set of clamps and at the completion of the clamping operation.

A process of making a heat exchanger, in accordance with U.S. Pat. No. 4,071,935, is illustrated generally in FIGS. 6–8. As indicated previously, the mesh layers 30 are placed between adjacent coil turns, with the slit 31 at an end of each turn, so that each series of layers and turns may be more readily placed in position for compression. After the additional layers 30' are placed at the top and bottom of the coil, a screen 27 may be placed at both the bottom and top of the mesh layers, together with the top perforated plate 13 and bottom perforated plate 14. This assembly, as in FIG. 6, is then placed within a press, normally hydraulic, having jaws 35 and 36 which are moved toward each other, in order to press simultaneously both the coil turns and the member 30, as from the condition illustrated by FIG. 4 to that illustrated by FIG. 5. The members may bulge outwardly at different points around the periphery of the compressed assembly, as a result of compression, but a wood block and a hammer, or other tool, may be utilized in forcing inwardly the outward bulges to a degree consonant with the ability of the side, front and end walls to compress the bulges further. The copper mesh described is well adapted to such a step, since it will normally retain a position to which it is forced.

While this assembly is still compressed and after the bulges have been corrected, the angular pieces, one comprising the side wall 16 and front wall 18 and the other side wall 17 and rear wall 19, are pressed in position, with front wall 18 having appropriate slots for the inlet and outlet pipes 25 and 26. The side walls are forced together, as by conventional clamps 37 and 38 of FIGS. 7 and 8, while clamps 39 and 40 of FIG. 8 engage the front wall 18 and rear wall 19, respectively. Clamp 40 is provided with holes 41, to accommodate the extending pipes 25 and 26. The pairs of clamps 37, 38 and 39, 40 are pushed toward each other to move the angular pieces diagonally until the inside of the housing walls reach a position nearly abutting or closely adjacent the periphery of the perforated plates 13 and 14. At this time, the abutting edges of the angular parts may be welded, as at 22, while the edges of the perforated plates may be tack welded to the inside of the side walls 16 and 17, as by tack or spot welds 15 of FIG. 7. The assembly may then be released from the clamps and press, at which time the top plate 20 and the bottom plate 21 may be attached to previously assembled walls, as by welding.

The above described process may be slightly modified by inserting a series of members between adjacent turns and compressing the members between the turns, in succession, such members having apertures for the flow of a fluid therethrough, means providing elongated heat conducting paths across the member and made of a material permitting said members to be deformed against each other and portions thereof against the coil turns. The coils may be wound with the turns spaced apart but are preferably wound with the turns close together, to reduce compression forces. Thus, a first turn, as at the bottom, may be separated from the next turn above while maintaining an essentially parallel relation. A series of members may be intially placed between a perforated plate 14 or also a screen 27 and the bottom turn, then an additional series of members, after separation of the turns inserted between the bottom turn and the next turn above. A pressure plate may be simultaneously placed beneath the next turn and then the lower jaw 36, or the equivalent, moved upwardly to compress appropriate members around the bottom turn. The pressure plate is then removed, the next pair of turns are separated individually, a series of members and a pressure plate inserted and the members then compressed down around the turn below, with the previous members being compressed against the same turn. Each pair of adjacent turns, in sequence, is similarly separated, a series of members and a pressure plate inserted and the members and turns compressed until the top turn is reached when a series of members may be placed above it and a screen 27 and perforated plate 13 placed on top of the members, then the members compressed against the top turn. An advantage of this procedure is that the pressure required to compress a few members is much less than that required to compress the entire assembly at one time. Thus, the force required to be produced by jaw 36, for instance, is correspondingly decreased, with a consequent decrease in the hydraulic or screw pressure required and a reduction in the size of the stress receiving parts of the press or equivalent.

When the members are inserted between separated coil turns, in succession, they will pass to either side of the opposite end of each turn when provided with slits 31 of FIG. 2. However, if not provided with such slits, the members may merely be pushed around the opposite end of the turn, so as to extend to the outside of the coil in that direction, except where the turn is engaged. The small space to left at this position may be filled with additional material and compressed against the turn, so that the material will later fill all of the space inside the housing. After the insertion, compression and space filling is complete, the angular housing members may then be positioned and compressed against the members and the abutting edges welded, then the perforated plates spot welded to the angular members. While the angular members are being pushed against the members, the inlet 25 and outlet 26 of the coil are, of course, guided through the holes therefor in front plate 18. After the perforated plates 13 and 14 have been tack welded in position, the clamps or jaws holding the coil and mesh assembly compressed may be removed and the top 20 and bottom 21 may be appropriately welded in position.

Figure 9:
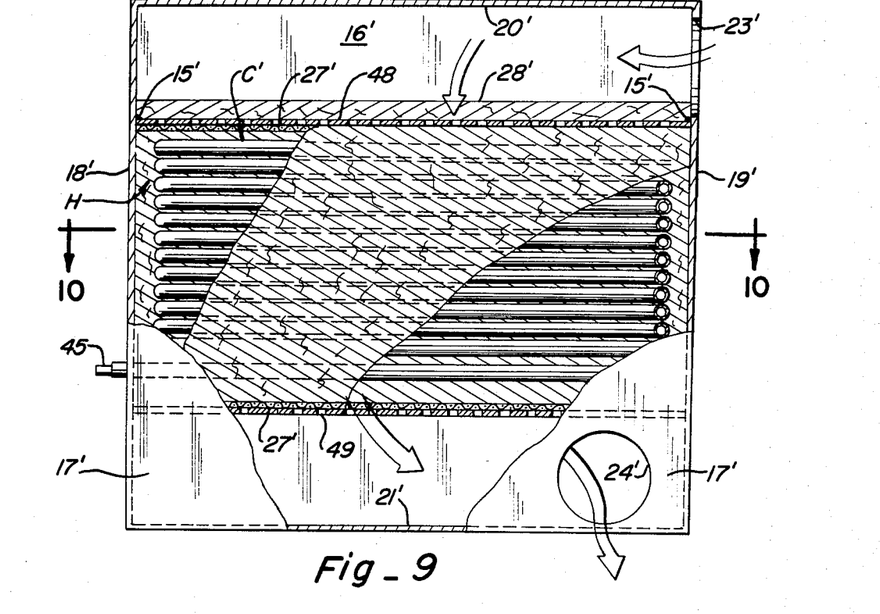
FIG. 9 is a side elevation, broken away to show interior parts and showing an alternative form of this invention.
Figure 10:
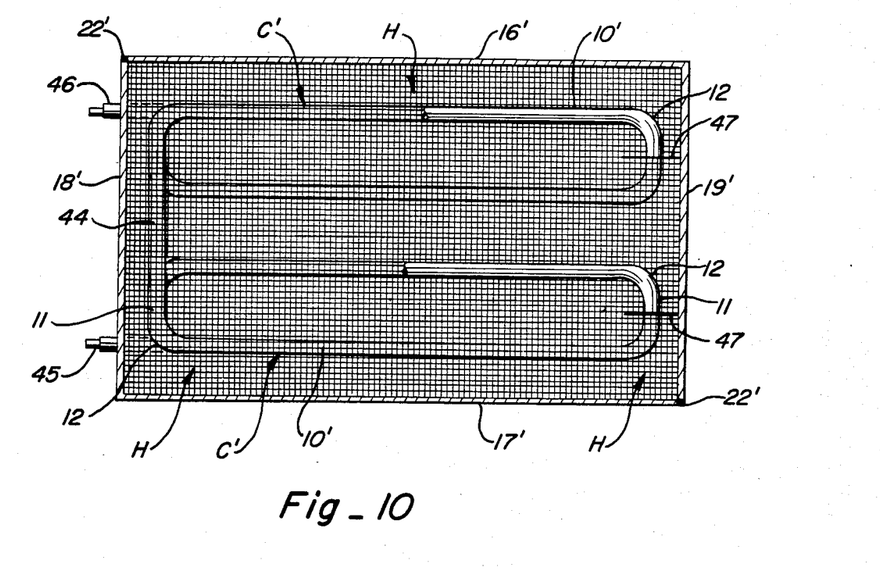
FIG. 10 is a horizontal section taken along line 10—10 of FIG. 9.

In the alternative heat exchanger construction illustrated in FIGS. 9 and 10, a pair of coils C' coupled by a connecting pipe 44, may be installed in a spaced lateral relation within heat transfer material H, which may consist of suitable members, such as deformable mesh layers in the nature of woven wire cloth, expanded foil or the like. One coil C' has an inlet 45 and the other an outlet 46 although the inlet and outlet may be reversed. It will be noted that, in one coil, the liquid flows countercurrent to the gas or vapor, but the flow is reversed for the opposite coil. This insures that the flow through at least one coil is countercurrent, irrespective of the inlet and outlet used. Each coil may be generally rectangular in configuration, with spaced and generally parallel ends and sides of the coil ascending in an otherwise spiral configuration. The deformable members may be inserted between the coils, spaced apart for a slightly greater distance than their diameter, in the manner illustrated in FIG. 4, with a pair of slits 47 adapted to overlap an end of laterally adjacent coils, to accommodate the spiral configuration. As before, additional members may be placed both above and below the coils, while the coils and members are compressed between a top perforated plate 48 and a bottom perforated plate 49, with a screen 27' interposed between the perforated plates and the members, as desired. This assembly is then compressed until the members between adjacent coils are compressed and clamped, not only to provide a pressure contact of the members with the respective coils, but also to increase the surface area of each coil turn contacted by the members. A series of members may be placed between successive adjacent turns, separated for the purpose and then compressed between the turns and against each other, as described previously.

A fluid inlet 23' may be placed at an upper position in the rear wall 19', while a front wall 18' is also provided with holes or slots to receive the inlet 45 and outlet 46 for the coils. A lower outlet opening 24', for the discharge of fluid, may be made in side wall 17' or at any other suitable location within the exterior plate surrounding the outlet manifold, formed between a lower perforated plate 49 and bottom wall 21'. The space between upper perforated plate 48 and top wall 20' serves as an inlet manifold, while inlet opening 23' may be moved to any desired position around the periphery of the inlet manifold.

The steps of clamping the members, coils and perforated plate assembly may be carried out similarly to those previously described, i.e. first compressing the assembly to merely a portion of its initial height, then pushing the lateral bulges inwardly and clamping the angular plates, described previously, against the compressed members. As before, when the desired compression has been obtained, the top and bottom perforated plates are attached, as by spot or tack welding, to the inside of the side walls 16' and 17', while the adjacent edges of the angular pieces are again attached, as by welds 22'. Or, the corresponding members may be inserted between individual pairs of coil turns and compressed in sequence, as also previously described.

Figure 11:
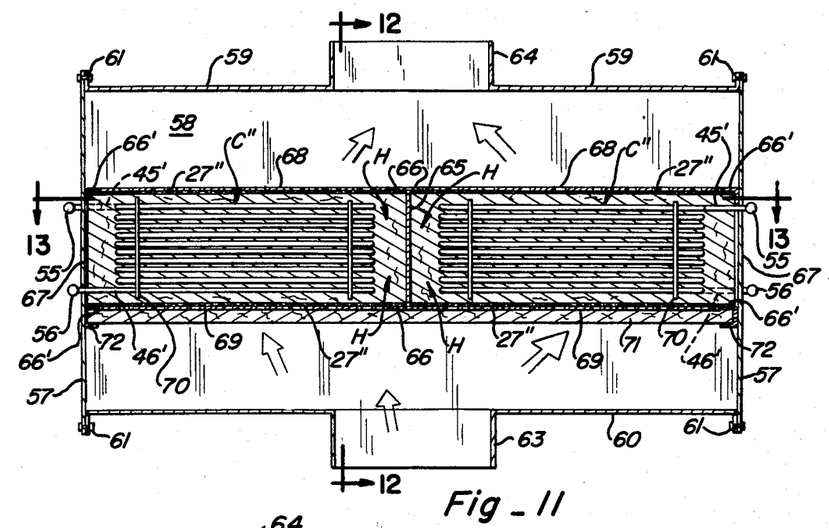
FIG. 11 is a vertical section similar to FIG. 3 but showing a further alternative form of this invention.
Figure 12:
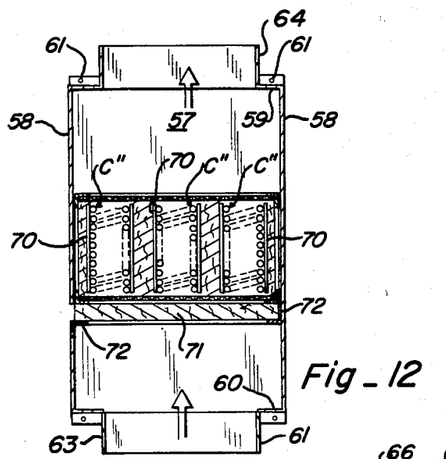
FIG. 12 is a vertical section taken transversely to FIG. 11 along line 12—12 thereof.
Figure 13:
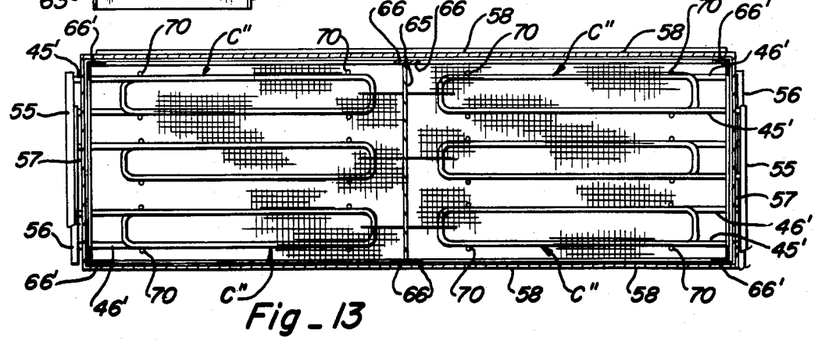
FIG. 13 is a horizontal section taken along line 13—13 of FIG. 11.

In the alternative form illustrated in FIGS. 11-13, there are two series of coils C", with three coils in each series, while the coils of each series are connected in parallel by upper inlet manifolds 55 and lower outlet manifolds 56, to which inlet pipes 45' and outlet pipes 46', respectively, are connected for the direction of flow of air shown by the arrows. For a reverse flow of air or other fluid, the inlet and outlet manifolds for the coils would be reversed to provide countercurrent flow. The heat transfer material H is again compressed between adjacent turns of each coil, to provide a greater area of contact of the material with the coil and also a compression of the strands, wires ribbons, etc., of the members against the turns. The three coils of each set may be placed side by side to increase the effective area of the coils and end to end so that the manifolds 55 and 56 may be placed at each end of the housing in which the coils are installed. This housing includes end plates 57, removably connected to side plates 58 and top and bottom plates 59 and 60, respectively, by flanges and bolt connections 61, as shown. Bottom plate 60 is provided with an air or gas inlet 63, while top plate 59 is provided with an air or gas outlet 64. The two coil series are separated by a web plate 65 having a flange 66 extending to each side at each end, while end plates 57 are provided at their edges with inwardly extending flanges 66'. A top perforated plate 68 and bottom perforated plate 69, for each set of coils, holds a screen 27" against the heat exchange material H, to hold it in compression until the edges of the perforated plates can be welded to the corresponding flanges 66 and 66'.

Prior to compression of the heat exchange material H in the coils C", a series of rods 70 may be pushed into the mesh material alongside each of the longer runs of the generally rectangular coils C", as in FIG. 13. During compression of the members and coils, the members will hold the rods in position, to prevent lateral displacement of any of the coils. The rods 70 are, of course, preferably shorter than the distance between opposed screens 27" and thus produce no interference with the compression or the attachment of the perforated plates 68 and 69 in final position.

A filter 71 may be placed at the fluid entrance area of the heat exchange material H, in order to prevent extraneous matter from becoming lodged in the heat exchange material. The filter 71 may be placed within a frame 72, for which conventional (not shown) support ledges may be provided, as well as conventional (not shown) provision for withdrawing the filter 71 for inspection and/or cleaning.

Figure 14:
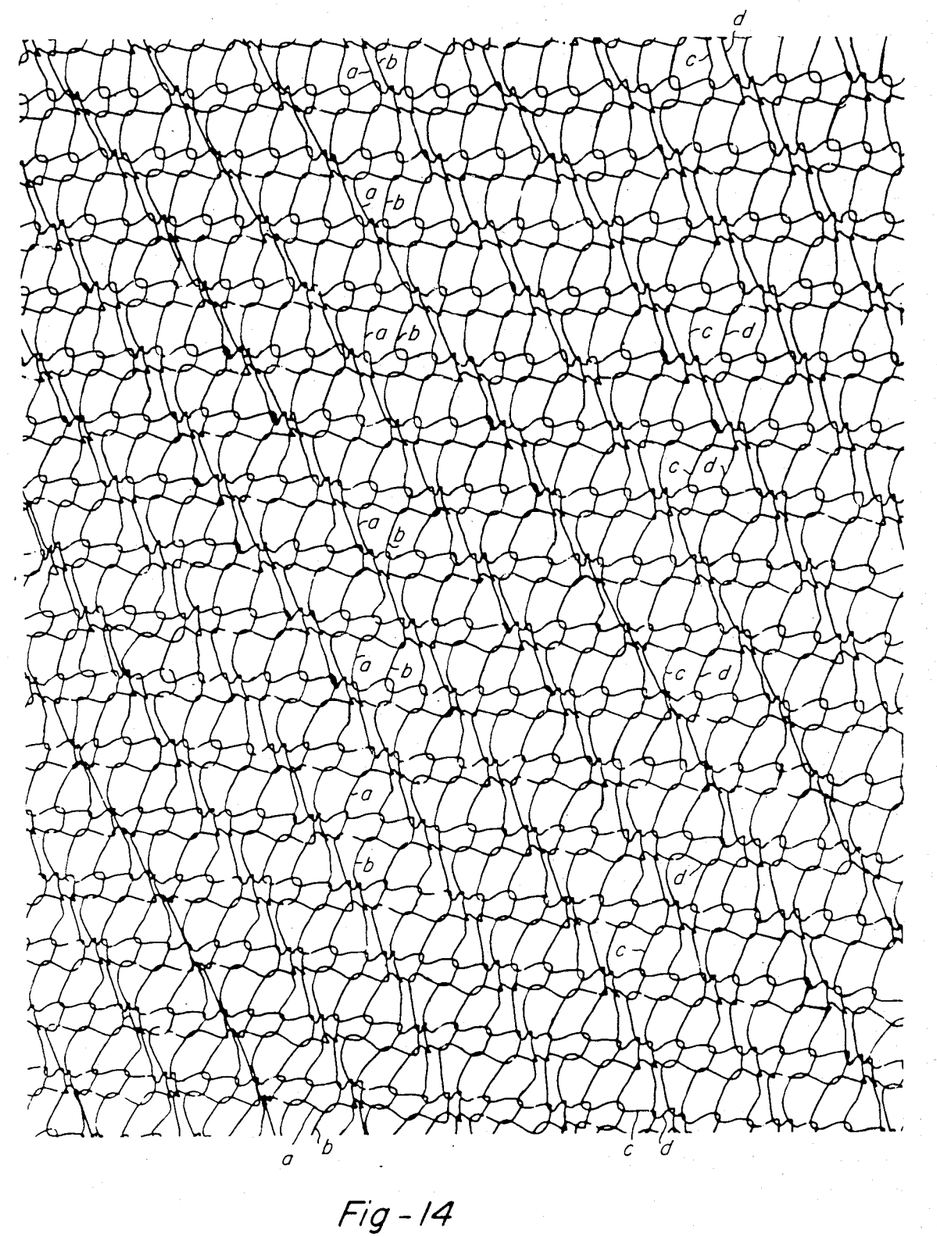
FIG. 14 is a photographic reproduction of a portion of woven wire mesh particularly adapted for use in the heat exchanger of this invention.

One specific type of suitable deformable member is the woven wire mesh illustrated in FIG. 14, which includes pairs of adjacent strands a, b and c, d which are connected to each other, as well as to preceding and subsequent strands, by intersecting loops. Although the strands extend substantially in one direction, it appears to make little difference whether the general lengthwise direction of the strands, as shown in FIG. 14, extends across the smaller or larger dimension of the space between the turns of the coil C, since not only do the strands themselves conduct heat between the coil turns and the fluid passing through the apertures in the compressed mesh, but also heat is conducted from one strand to the next strand by compression contact. Strands of a diameter of 0.006 to 0.009 inches have been found to be suitable.

Figure 15:
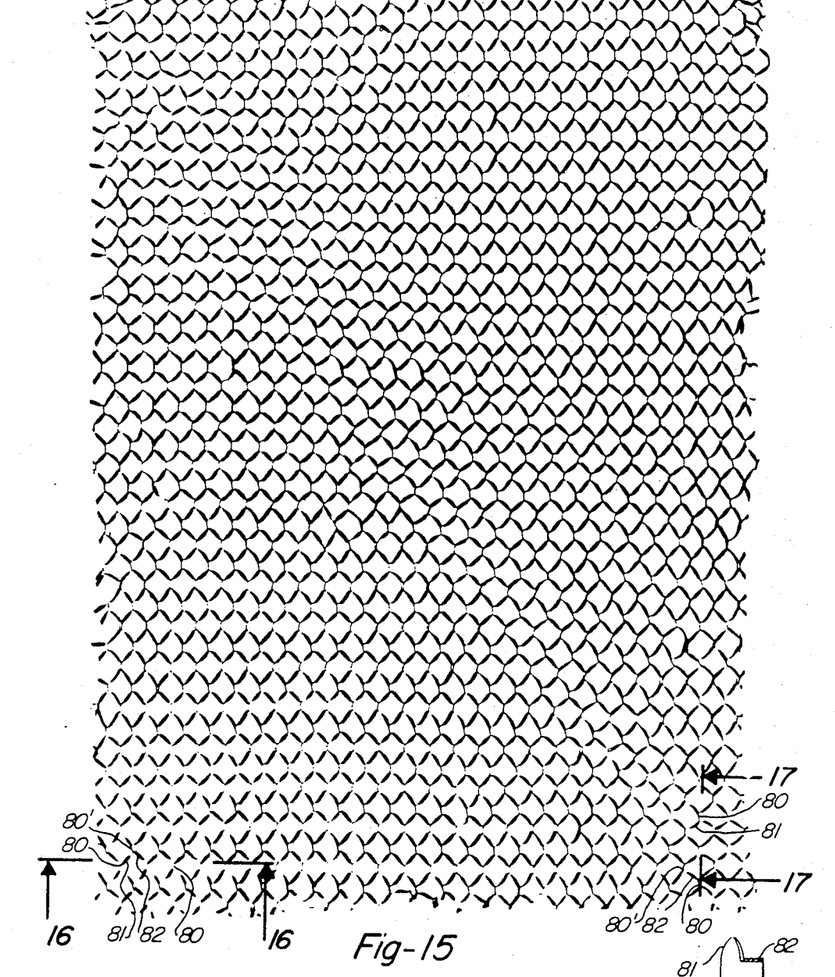
FIG. 15 is a photographic reproduction of a portion of an expanded metal foil also particularly adapted for use in the heat exchanger of this invention.
Figure 16:
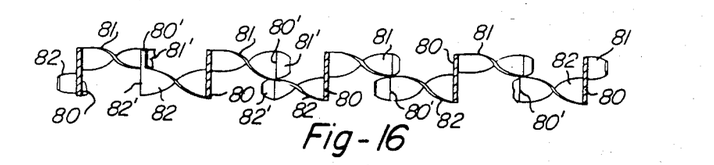
FIG. 16 is a fragmentary section, on an enlarged scale, taken along line 16—16 of FIG. 15.
Figure 17:
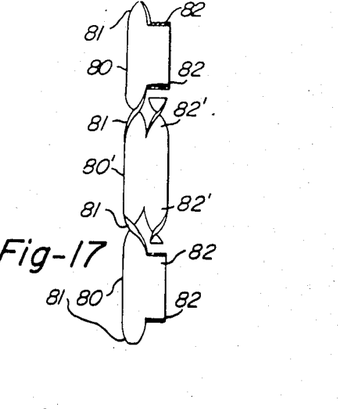
FIG. 17 is a fragmentary section, on an enlarged scale, taken along line 17—17 of FIG. 15.

Another suitable type of deformable member is the expanded metal foil illustrated in FIGS. 15–17, which may be formed from copper or aluminum, as well as other material having sufficient heat conductivity, from sheets of a suitable thickness, such as on the order of 0.002 to 0.004 inch in thickness. When the foil is expanded in a suitable die, the area of the foil is increased considerably. In tne particular embodiment illustrated, a series of small panels or junctions 80 and 80' which are adjacent each other prior to expansion but become separated, are connected by elongated ribbons or ribs 81 and 82. Panels 80 are closer to the section line, being in section in FIG. 16, while panels 80' are rearwardly thereof or spaced further from the section line. In FIG. 16, the section line is perpendicular to panels 80 and 80', but in FIG. 17, it is parallel to the panels. The panels 80 and 80' are tipped with respect to the original plane of the sheet during expansion, while the ribbons 81 and 82 are twisted due to the tipping of the panels. In the relationship shown in FIGS. 16 and 17, an upper strip 81 connects one side of each panel 80 with a rearward panel 80', while a lower strip 82 connects the opposite side of each panel 80 with a rearward panel 80'. Additional strips 81' and 82' extend rearwardly on opposite sides of the rearward panels 80' to other panels rearwardly therefrom, but essentially in parallel to the panels 80. In FIG. 17, lower strips 82 extend forwardly from panels 80, but are shown in section at the point of intersection with the section line 17—17. Through the expansion of the foil, the interconnection of the panels 80 and 80' through strips 81, 82 provide elongated heat conducting paths along which heat can be transferred from or to substantially any area of the expanded foil, to the areas in which a series of foil layers are in compression between two adjacent turns of the coil. The foil, which may be formed of copper or aluminum, although aluminum is preferred because of its low cost, can be compressed together to provide intimate contact between adjacent layers, but still leave sufficient openings to permit the ready flow of a fluid, either a gas or vapor, such as air, or liquid, with the result that the contact of the fluid with the panels 80, 80' and ribbons 81, 82 provide an efficient and effective heating (or cooling) of the fluid. Apparently, due in part to the flat sides of the panels and ribbons, a heat exchanger having expanded foil produced from aluminum sheets 0.003 inches in thickness was tested and found to produce a greater amount of heat transferred than a heat exchanger having a woven mesh formed from copper wire, despite the higher rate of heat conductivity of copper. It will be understood, of course, that the deformable, heat conductive members having apertures for flow of fluid may be produced in other ways than by weaving wire mesh or by expanding foil. It will further be understood that ways of carrying out the compression of the mesh layers against the coil turns and against each other may be utilized, in addition to those described. Furthermore, the material of which the parts are made may vary, as in accordance with the properties of the fluid passing through the coils or the heat exchange material or both. For some fluids, it may be desirable to use aluminum or other light metal or alloy. For other fluids, it may be desirable to use titanium or selenium or other material, such as plastic. In general, the metal or other material which will provide the greatest rate of heat transfer is desirable, except when the properties of one or both fluids require a different material. While copper and aluminum have been referred to as material for use as the strands of the mesh layers, as sheets for use in forming expanded foil, or other means providing elongated heat conducting paths across the members, it will similarly be understood that other materials may be used, such as other metals or appropriate types of plastic, particularly when the fluid is corrosive or has properties deleterious to the materials normally used.

Although the machine on which the woven wire mesh of FIG. 14 was produced was manufactured by Maschinfabrik Karl Muller, oHG of 8832 Weissenburg 1 Bayer, West Germany, it will be understood that other styles of machines and other styles of wire mesh may be utilized.

Although alternative embodiments of this invention have been illustrated and described, it will be understood that other embodiments may exist and that various changes may be made, all without departing from the spirit and scope of this invention.

What is claimed is:

1. A heat exchanger comprising:
   a hollow coil including a series of connected turns in a generally parallel spiral relation and through which a liquid is to be passed for heat transfer;
   a multi-layer assembly of members disposed between substantially each adjacent pair of turns, with each member extending generally parallel to the plane of the respective coil turns and across the central space within said turns;
   said members having apertures for the flow of a fluid therethrough, having means providing elongated heat conducting paths across said members and made of a material permitting said members to be deformed against each other and said turns;
   said members being compressed against each other and portions of said members being compressed between and deformed against adjacent turns of said coil;
   means laterally enclosing said coil and members; and
   substantially non-deformable perforate means engaging the member at each end of said coil for restraining said members to maintain the deformed and compressed condition thereof and the compression contact of said deformed portions of said members with the coil turns to permit conduction of heat along said members between the turns and the space encompassed by the coil turns, whereby a fluid for heat transfer may flow through said members in a direction transverse to the plane of the respective coil turns.

2. A heat exchanger as defined in claim 1, wherein: said members comprise mesh members having strands.

3. A heat exchanger as defined in claim 2, wherein: said mesh members are formed of metal.

4. A heat exchanger as defined in claim 1, wherein: said members are formed of perforated metal sheets.

5. A heat exchanger as defined in claim 4, wherein: said members comprise expanded metal foil.

6. A heat exchanger as defined in claim 5, wherein: said foil has a thickness on the order of 0.002 to 0.006 inches.

7. A heat exchanger as defined in claim 1, wherein: said members are formed of a metal selected from the group consisting of copper and aluminum.

8. A heat exchanger as defined in claim 1, wherein: said coil is formed of metal.

9. A heat exchanger as defined in claim 1, including: a perforated plate perpendicular to the axis of said coil and engaging said members at each end of said coil.

10. A heat exchanger as defined in claim 9, including: a screen between said perforated plate and said members in at least the position for said incoming fluid.

11. A heat exchanger as defined in claim 9, wherein: said perforated plates are attached to said laterally enclosing means.

12. A heat exchanger as defined in claim 1, wherein: said laterally enclosing means includes a pair of angular parts compressed against the lateral edges of said members.

13. A heat exchanger as defined in claim 1, wherein:
a fluid chamber is disposed adjacent said members at each end of said coil.

14. A heat exchanger as defined in claim 1, including:
a series of coils disposed in side to side relation with inlets and outlets at corresponding positions;
a manifold connected to each of the inlets; and
a manifold connected to each of the outlets.

15. A heat exchanger as defined in claim 14, wherein:
said inlets and outlets of said coils extend through said means laterally enclosing said coils.

* * * * *